Figure 1:
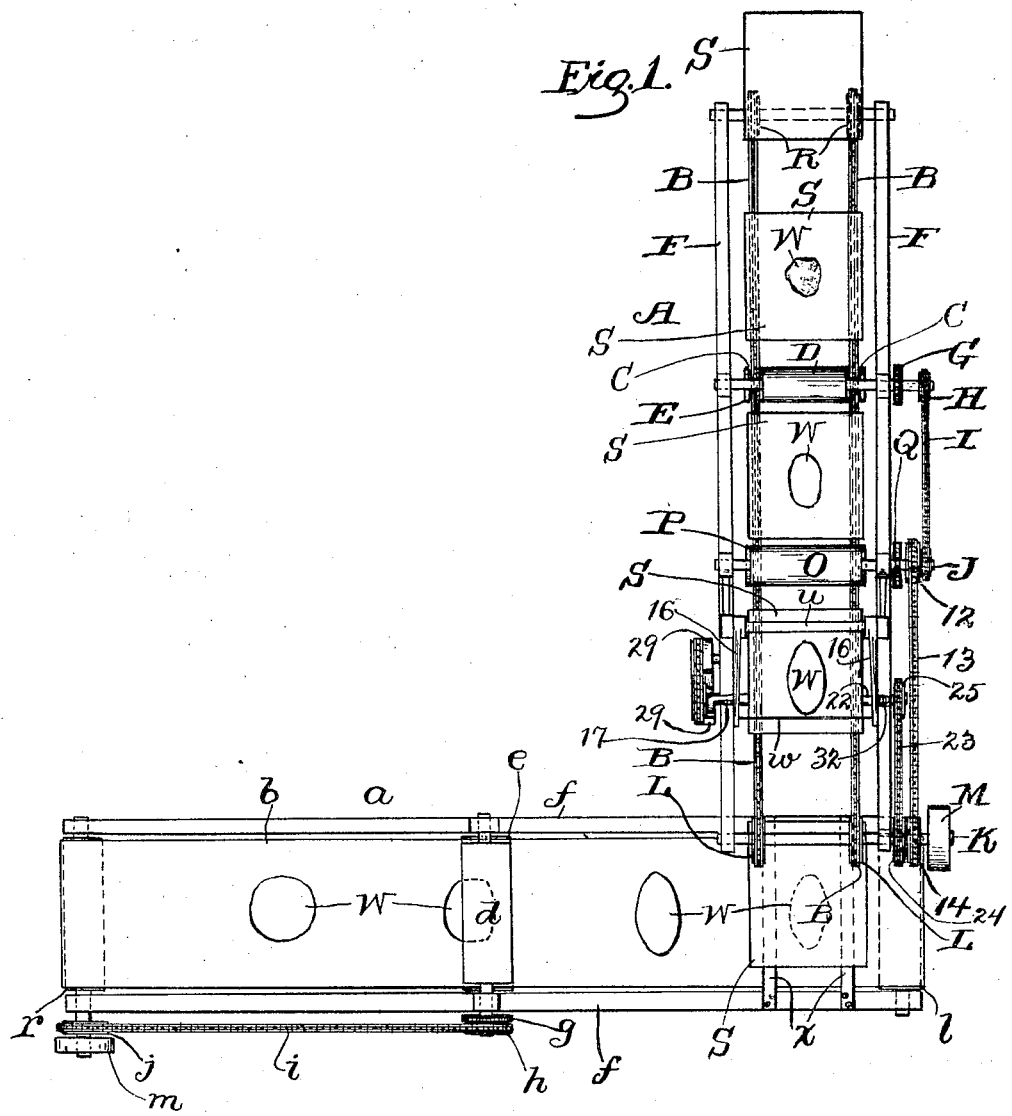

No. 806,869. PATENTED DEC. 12, 1905.
J. H. BURNS.
APPARATUS FOR SPREADING DOUGH FOR THE MAKING OF PIE CRUSTS.
APPLICATION FILED APR. 4, 1904.

4 SHEETS—SHEET 1.

WITNESSES:
Daniel E. Haly.
G. M. Hayes

INVENTOR
Joseph H. Burns
BY
Lynch & Norris
his ATTORNEYS

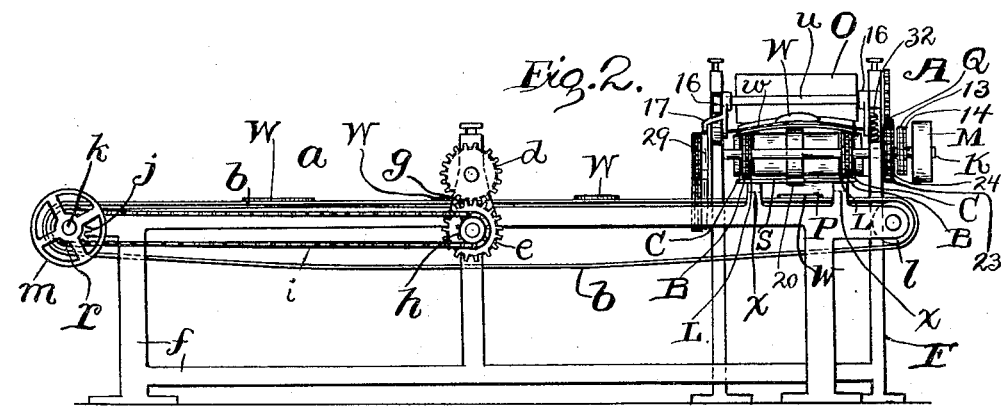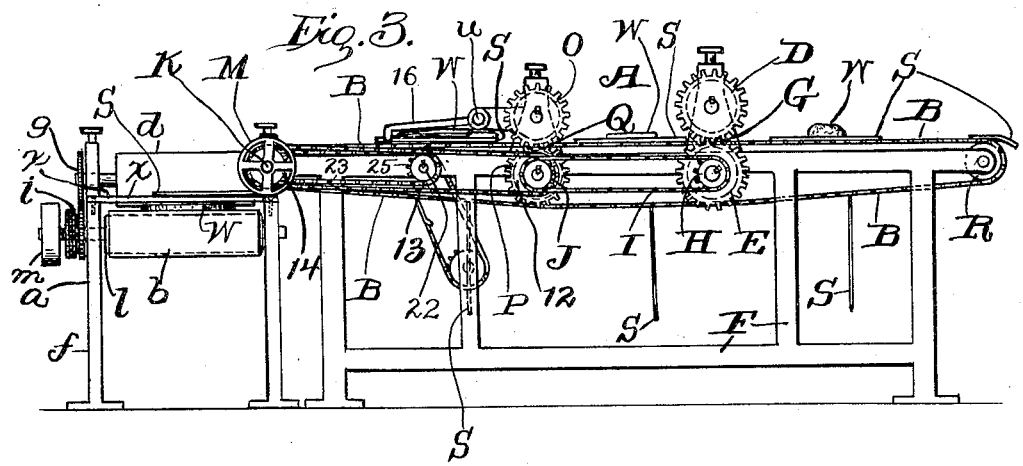

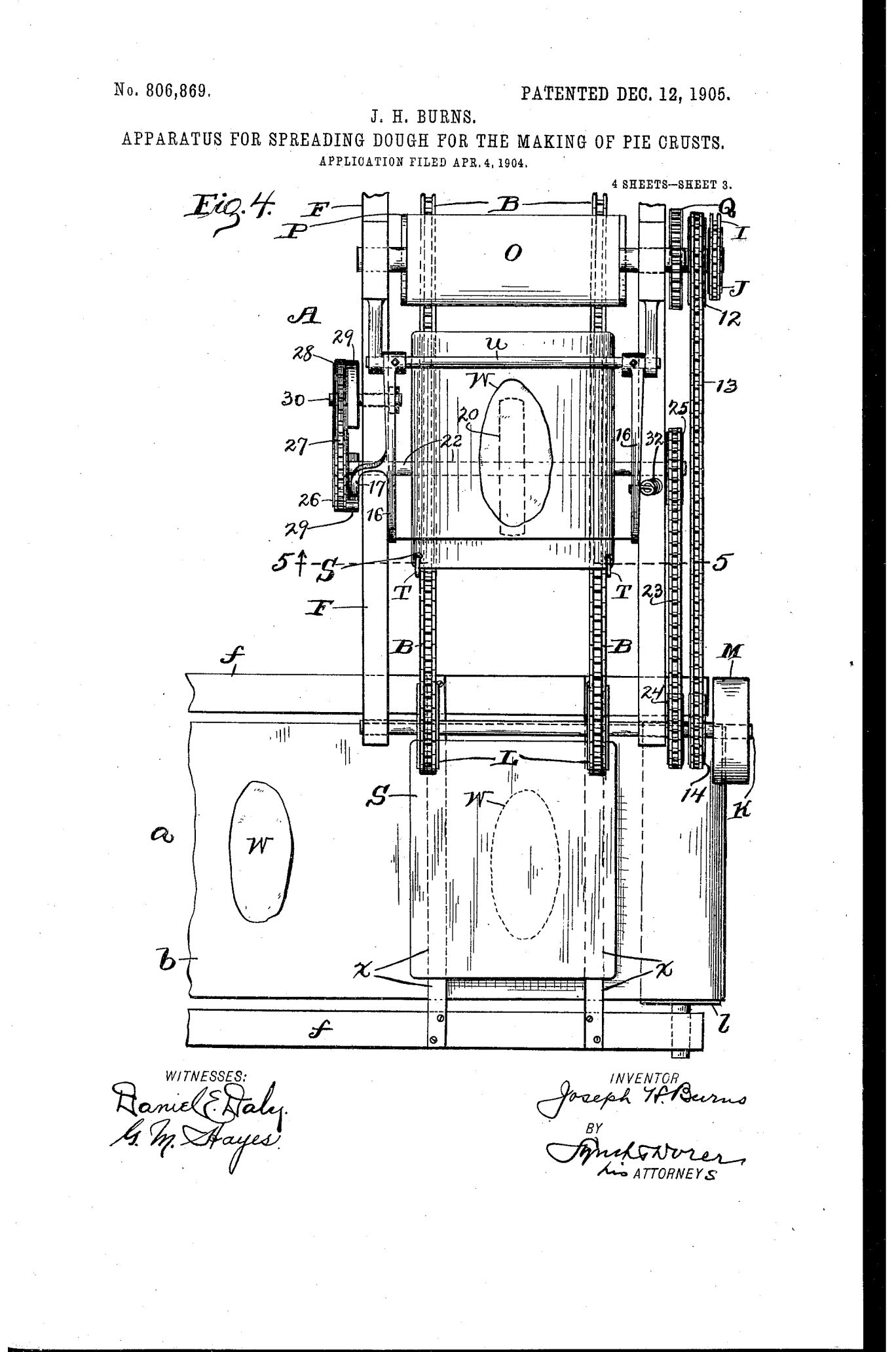

No. 806,869. PATENTED DEC. 12, 1905.
J. H. BURNS.
APPARATUS FOR SPREADING DOUGH FOR THE MAKING OF PIE CRUSTS.
APPLICATION FILED APR. 4, 1904.

4 SHEETS—SHEET 3.

Fig. 4.

WITNESSES:
Daniel E. Daly
G. M. Hayes

INVENTOR
Joseph H. Burns
BY
his ATTORNEYS

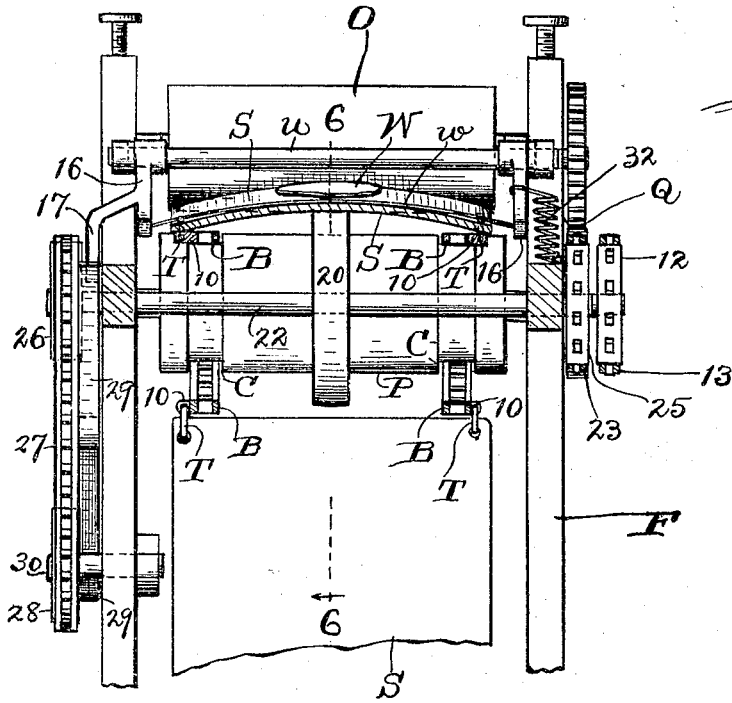

UNITED STATES PATENT OFFICE.

JOSEPH H. BURNS, OF CLEVELAND, OHIO.

APPARATUS FOR SPREADING DOUGH FOR THE MAKING OF PIE-CRUSTS.

No. 806,869.     Specification of Letters Patent.     Patented Dec. 12, 1905.

Application filed April 4, 1904. Serial No. 201,489.

*To all whom it may concern:*

Be it known that I, JOSEPH H. BURNS, a citizen of the United States of America, residing at Cleveland, in the county of Cuyahoga and State of Ohio, have invented certain new and useful Improvements in Apparatus for Spreading Dough for the Making of Pie-Crusts; and I hereby declare the following to be a full, clear, and exact description of the invention, such as will enable others skilled in the art to which it pertains to make and use the same.

This invention relates to improvements in dough-rolling or dough-spreading apparatus more especially designed for rolling or operating upon a chunk or piece of dough and flattening and forming it into an oblong shape and then rolling or operating upon the flattened and elongated piece of dough and spreading the latter into an approximately circular shape or layer and not only overturning the elongated piece of dough between the aforesaid operations, but positively insuring the freedom of the elongated piece of dough to readily overturn without injury to the dough and without necessitating much, if any, flouring.

This invention consists more especially in an improvement of dough-spreading apparatus comprising a table having a dough-feeding endless conveyer instrumental in forming the upper side of the said table, means for actuating the said conveyer, another table arranged in suitable proximity to the first-mentioned table and comprising a movable dough-feeding endless conveyer arranged to receive a piece of dough which has been operated upon and fed by the conveyer of the first-mentioned table, and means whereby a chunk or piece of dough operated upon on the first-mentioned table is delivered onto the other table and turned over during its delivery to the last-mentioned table.

The general object of this invention is to roll chunks or pieces of dough into the desired form economically and with great facility, with the amount of flouring necessary reduced to a minimum.

A special object of this invention is to first roll a chunk or piece of dough, and thereby elongate the same, upon an overturnable apron without materially or at all flouring the said apron, then to positively loosen the elongated piece of dough relative to the apron, then to actuate the said apron, and thereby overturn the elongated piece of dough, and then to again roll and thereby spread the dough into an approximately circular layer.

With these objects in view, and to the end of providing a machine or apparatus which is simple and reliable in its operation, this invention consists in certain features of construction and combinations of parts hereinafter described, and pointed out in the claims.

In the accompanying drawings, Figure 1 is a top plan of a machine or apparatus embodying my invention. Figs. 2 and 3 are elevations taken at right angles to each other. Fig. 4 is a top plan of a portion of the apparatus and shows more especially the means employed for loosening the elongated piece of dough relative to the apron upon which the said piece of dough is carried. Fig. 5 is a vertical section on line 5 5, Fig. 4, looking in the direction indicated by the arrow. Fig. 6 is a section on line 6 6, Fig. 5, looking in the direction indicated by the arrow. Fig. 7 is a section corresponding with Fig. 6 except as to the position of the moving parts therein illustrated. Fig. 8 is a section in detail, illustrative of the means employed in securing the aprons S to the chains B. Figs. 4, 5, 6, and 7 are drawn on a larger scale than Figs. 1, 2, and 3. Fig. 8 is drawn on a still larger scale.

Referring to Figs. 1, 2, 3, and 4 of the drawings, A and *a* designate two dough-rolling tables arranged at a right angle to each other, with the table A somewhat higher than the table *a*. The table A comprises a dough-feeding endless conveyer consisting of two endless parallel chains B and aprons S, attached to the said chains. The chains B are arranged a suitable distance apart horizontally and actuated simultaneously in the same direction and in unison. The aprons S are arranged a suitable distance apart longitudinally of the chains B and extend between and overlap the chains at the outer sides of the chains and participate in forming the upper surface of the table A. The table *a* comprises an endless belt or conveyer *b*, which forms the upper surface of the said table, with the upper and dough-feeding portion of the said conveyer arranged in a horizontal plane. The upper and dough-feeding portion of the conveyer *b* is arranged at an elevation a suitable distance below the upper and dough-feeding portion of the conveyer of the table A. Preferably the conveyer of the table A at the dough-delivering end of the said table somewhat overhangs the conveyer $b$ at the dough-receiving end of the table $a$. Obviously the conveyer of the table A is actuated in the direction required to feed dough rolled thereon, as will hereinafter appear, to the conveyer $b$, and the latter is actuated in the direction required to feed the dough delivered thereon away from the table A. Any approved means for operating the different conveyers may be provided, and each table is provided with suitable means for rolling the pieces of dough fed by the conveyer of the said table. As shown, the table A comprises two pairs of horizontal rolls, with the rolls of each pair of rolls extending transversely of the said table at the upper side and lower side, respectively, of the upper and dough-feeding portion of the conveyer of the said table and arranged at a right angle to the said conveyer. D and E designate the upper roll and lower roll, respectively, of one of the said pairs of rolls, and O and P represent the upper roll and lower roll, respectively, of the other of the said pairs of rolls. The rolls of each of the said pairs of rolls are arranged in the same plane vertically, and the lower rolls E and P form bottom bearings for the upper and dough-feeding portion of the conveyer of the table A. The pair of rolls D and E and the pair of rolls O and P are arranged a suitable distance apart longitudinally of the table A. The pair of rolls O and P are arranged nearer the dough-delivering end of the table A than the pair of rolls D and E, and the rolls D and E are therefore arranged to first operate upon the chunk or piece of dough which is to be rolled and spread into a circular layer. The said rolls are supported in any approved manner from the stationary framework F of the table A, and the lower rolls E and P are grooved annularly and circumferentially, as at C, to accommodate the location and operation of the chains B, as shown in Figs. 1 and 5. The upper roll D is somewhat shorter than the lower roll E, and the said rolls D and E are intergeared at one end with each other, as at G, (see Fig. 3,) so that the said rolls during their rotation turn in opposite directions, respectively, as required. A sprocket-wheel H is operatively connected and arranged in line axially with the lower of the gears G, employed in establishing operative communication between the rolls D and E. The sprocket-wheel H is operatively connected by a chain I with a sprocket-wheel J, which is operatively connected and arranged in line axially with the lower roll P of the pair of rolls O P. The upper roll O is shown somewhat shorter than the lower roll P, and the said rolls O and P are intergeared at one end with each other, as at Q, so that the said rolls during their rotation turn in opposite directions, respectively, as required. A sprocket-wheel 12 is operatively connected and arranged in line axially with the lower of the gears Q employed in establishing operative communication between the rolls O and P. The sprocket-wheel 12 is operatively connected by a chain 13 with a sprocket-wheel 14, which is operatively mounted on the driving-shaft K, suitably supported from the framework F and arranged horizontally and parallelly with the hereinbefore-mentioned rolls. The chains B of the conveyer of the table A lead at the dough-delivering end of the said table over diametrically-corresponding sprocket-wheels L, which are operatively mounted on the shaft K, which is operatively provided with a driving-wheel M, to which power is applied in any approved manner. The chains B lead at the dough-receiving end of the table A over diametrically-corresponding sprocket-wheels R, which are supported from the framework F in any suitable manner.

The parts are so arranged and timed that chunks or pieces of dough delivered to the conveyer of the table A in advance of the upper roll D are first fed in under the said roll toward the upper roll O and thence under the said roll O to the conveyer $b$ of the table $a$ and operated upon by the said rolls, and thereby elongated longitudinally of the conveyer of the table A during their passage to the conveyer $b$. The roll D is adjusted somewhat higher than the roll O. The adjustment of the rolls D and O relative to the thickness of the chunk of dough to be operated upon is such that the reduction in thickness and elongation of the dough upon the table A is first partially effected by and between the rolls D and E and completed by and between the rolls O and P. By distributing the work required to roll and elongate the dough upon the table A between two pairs of rolls variations in the thickness or shape of chunks or pieces of dough to be successively operated upon are accommodated, and the rolling of the dough is more satisfactory and less flouring is required than with a single pair of rolls.

The chains B of the conveyer of the table A are provided at their outer sides, as already indicated, with aprons S, spaced equidistantly and arranged longitudinally of the said conveyer. Each apron S is attached at its forward end only, preferably by two parallel rings T, as shown in Figs. 4, 5, and 8, to two lugs 10, formed upon links of the different chains B, respectively, which rings extend loosely through the apron and loosely through the said lugs so as to render the said apron capable of being swung upwardly and in the direction of the table $a$, as will hereinafter more clearly appear.

The pairs of rolls D E and O P are located, preferably, centrally between the ends of the table A and separated somewhat more than the length of an apron S.

A chunk W of dough to be rolled and spread is placed upon each apron S as the said apron, during the actuation of the conveyer comprising the apron, approaches the roll D. A chunk W of dough having been placed upon an apron S preparatory to the feeding of the same to and in under the roll D is operated upon during its passage in under the said roll and rolled and thereby partially spread longitudinally of the said apron, and consequently longitudinally of the conveyer comprising the said apron, whereupon the partially-elongated chunk of dough passes in under the roll O and is there further elongated, as required, preparatory to the delivery of the said chunk of dough to the conveyer $b$ of the table $a$.

Figs. 1 and 3 illustrate three chunks of dough upon the table A, one chunk of dough passing to the roll D to be partially elongated longitudinally of the said table, another and partially-elongated chunk of dough passing from the roll D to the roll O to be further elongated, and another chunk of dough having been completely elongated upon the said table and next to be delivered to the conveyer $b$ of the table $a$. Figs. 1, 3, and 4 illustrate the delivery of an elongated piece of dough to the conveyer of the table $a$. Of course each apron S preparatory to the deposit thereon of a chunk of dough may be floured, and the said chunk of dough is floured on top preparatory to its passage under the roll D.

The aprons S of the conveyer of the table A are flexible and yet sufficiently stiff to render them capable of swinging upwardly toward and over the table $a$ during the passage of the said aprons around the driving sprocket-wheels L. In Figs. 1, 2, and 4 a dough-laden apron S is shown swung onto the table $a$ from the table A.

Obviously each dough-laden apron of the conveyer of the table A in swinging from over the said conveyer toward and over the conveyer $b$ of the table $a$ overturns its load (an elongated chunk of dough) and deposits the latter onto and transversely of and at a right angle to the said last-mentioned conveyer.

Each apron S consists, preferably, of a sheet of rubber or other elastic and compressible material and suitably covered, prepared, or faced upon its outer side to form a desirable seat for dough.

To prevent the aprons S of the conveyer of the table A from flapping against the conveyer $b$ of the table $a$ during the delivery of the partially-rolled dough from the table A onto the table $a$, the stationary framework $f$ of the table $a$ is provided over the conveyer of the said table $a$ and in suitable proximity to the upper surface of the upper and dough-feeding portion of the said conveyer with two cross-bars $x$, which are rigidly secured at both ends to the said framework and arranged transversely of the said conveyer and such a distance apart longitudinally of the conveyer and in such position relative to the conveyer of the table A that each apron S will upon swinging toward and over the table $a$ flap against the said bars, so that any partially-rolled dough carried by the said apron will positively drop from the apron and fall overturned between the said bars onto the conveyer $b$. It will be observed, therefore, that the arrangement of the parts is such that a chunk or piece of dough elongated upon the table A is during its delivery from the said table to the table $a$ deposited upon the latter crosswise of the conveyer of the last-mentioned table. An apron S having struck against the bars $x$ of the table $a$ and delivered partially-rolled dough to the said table is during the actuation of the conveyer comprising the said apron removed from the table $a$ and from over the dough thus delivered onto the said table and another dough-laden apron approaches the said table.

As shown, the table $a$ comprises two horizontal rolls $d$ and $e$, which extend tranversely of the said table at the upper side and lower side, respectively, of the upper and dough-feeding portion of the conveyer $b$ and are arranged at a right angle to the said conveyer. The rolls $d$ and $e$ are arranged in the same plane vertically and preferably about centrally between the ends of the table $a$. The lower roll $e$ forms a bottom bearing for the upper and dough-feeding portion of the conveyer $b$. The rolls $d$ and $e$ are suitably supported from the framework $f$ and are intergeared with each other, as at $g$, so that the said rolls during their rotation turn in opposite directions, respectively, as required. One of the gears $g$ establishing operative connection between the rolls $d$ and $e$ is operatively provided with a sprocket-wheel $h$, which is arranged in line axially with the respective gear and operatively connected by a chain $i$ with a sprocket-wheel $j$, which is operatively connected and arranged axially in line with the roller $r$, supported from the framework $f$ and parallel with the rolls $d$ and $e$. The conveyer $b$ leads at the dough-receiving end of the said table $a$ over a suitably-supported guide-roller $l$. The conveyer $b$ leads at the opposite end of the said table over the roller $r$, which is employed in actuating the said conveyer. The roller $r$ is operatively provided with a driving-wheel $m$, to which power is applied in any approved manner.

By the arrangement of the parts hereinbefore described it will be observed that the partially rolled and elongated pieces of dough delivered from the conveyer of the table A to and crosswise of the conveyer $b$ of the tables $a$ are fed to and in under and rolled by the roll $d$ of the last-mentioned table, and thereby spread into an approximately circular layer, as shown.

Fig. 1 of the drawings illustrates the feeding of a partially-rolled fully-elongated piece of dough to the roll *d*, another elongated piece of dough being rolled widthwise by the said roll, and thereby spread into an approximately circular layer, and a piece of dough in the form of circular layer ready to be removed from the table *a*.

It is obviously desirable to wholly or largely dispense with the flouring of the dough in preventing the dough from sticking to a dough-laden apron S when the said apron is being overturned onto the table *a*, and means employed for rendering the dough positively loose relative to the apron is arranged to operate between the final elongation of the piece of dough upon the table A and the delivery of the said dough to the table *a* and comprises, preferably, a fine strand *w*—such, for instance, as a piece of thin steel wire which is arranged over and extends transversely of the conveyer of the table A and rendered operative preparatory to the swinging of the dough-laden apron onto the table *a*. The strand *w* is arranged, preferably, about midway between the roll O and the table *a*, as shown in Fig. 1. The strand *w* is borne, preferably, by the two arms 16 of an oscillating shaft *u*, which is arranged horizontally and parallelly with the roll O between the said roll and the table *a* and a suitable distance above the conveyer of the table A. The shaft *u* (see Figs. 4, 5, and 7) extends beyond opposite sides of the conveyer of the table A and is suitably supported from the framework F. The two strand-bearing arms 16 are fixed upon opposite ends, respectively, of the shaft *u* and project from the shaft downwardly and in the direction of the table *a*, and the strand *w* extends between and is suitably secured to the free ends of the said arms. The thickness of the strand *w* is exaggeratively shown in the drawings.

The aprons S of the upper and dough-feeding portion of the conveyer of the table A pass during the actuation of the said conveyer over the peripheral surface of a roller 20, which is loosely mounted on and centrally of a shaft 22, arranged horizontally and parallelly with but below the shaft *u* between the roll P and the dough-delivering end of the table A and supported from the framework F. Power is transmitted to the shaft 22 from the shaft K by an endless chain 23, arranged at one side of the table A and operatively engaging diametrically-corresponding sprocket-wheels 24 and 25, operatively mounted on the shaft K and shaft 22, respectively. The shaft 22 extends beyond opposite sides of the table A. The sprocket-wheel 25 is mounted on one end of the shaft 22, and a sprocket-wheel 26 is operatively mounted on the opposite end of the said shaft. An endless chain 27 operatively engages the sprocket-wheel 26 and leads over a sprocket-wheel 28, which is loosely mounted on an axle 30, supported from the framework F. The endless chain or conveyer 27 is provided with two lifting members 29, arranged a suitable distance apart longitudinally of the said conveyer and of suitable length, as will hereinafter more clearly appear, and the adjacent shaft-arm 16 is provided at its outer side with a depending member 17, which projects into the path of the aforesaid lifting member 29. The roller 20 is arranged to afford bearing at its periphery, as already indicated, to each dough-laden apron S during the passage of the said apron over the said roller on its way to the table *a*; but the said roller projects somewhat above the path of the said apron, so that the apron S during its said passage over the said roller is lifted by the latter, as shown in Figs. 5 and 6. The periphery of the roller 20 is convex or curved outwardly and transversely, so as to accommodate the curving of the apron upwardly and transversely during its passage over the roller, as shown in Fig. 5. A suitably-applied spiral spring 32, attached at one end to one of the shaft-arms 16 and attached at the other end to the stationary framework F, acts to retain the shaft-arms 16 and the connected strand *w* in their lower position. The arrangement and operation of the parts and the length of the lifting members 29 of the conveyer 27 are such that the shaft-arms 16 and the connected strand *w* shall be held in their upper position by one of the said members 29 long enough to enable the passage of the next-succeeding apron S in under the said strand before any apron S has passed from in under the strand; that the projecting member 17 of the respective shaft-arm 16 shall be released by the engaging member 29 of the conveyer 27 as soon as a dough-laden apron S has commenced to pass in under the strand *w* and before the dough upon the apron has entered the sweep of the strand, so as to result in the said strand dropping by the gravity of the shaft-arms 16 and action of the spring 32 into its lower position, wherein the strand is operative and rests upon the said apron; that in the lower and operative position of the strand *w* the member 17, as hereinbefore described, projects into the path of the members 29; that each apron S is lifted somewhat by the roller 20 during the passage of the said apron over the said roller and is held lifted, so as to cause the strand *w* to bear somewhat down upon the said apron and curve the strand upwardly to cause the strand to conform to the curvature of the central and dough-bearing portion of the apron; that the shaft-arms 16 will yield sufficiently to accommodate a curvature of the strand *w*; that the strand *w* shall during the passage of the lifted apron toward the table *a* positively loosen the dough upon the said apron relative to the apron, and the dough thus loosened relative to the said apron shall pass over the strand *w* during the passage of the apron toward the table *a*, so that the said piece of dough upon the apron is loosened over its entire under surface relative to the apron; that the close engagement of the strand *w* with the dough-laden apron during the loosening of the dough by the said strand from the apron prevents injury to the dough by the strand; that a lifting member 29 engages the member 17, and thereby swings the shaft-arms 16 and connected strand *w* upwardly against the action of the spring 32 and renders the said strand inoperative as soon as the piece of dough upon the said apron has entirely passed over the strand, and that the said strand is held in its upper position until the next succeeding dough-laden apron has begun to pass in under the strand on its way toward the table *a*.

In the case illustrated the conveyer 27 is provided, as already indicated, with two lifting members 29, which are arranged to operate alternately during the actuation of the said conveyer. Each lifting member 29 consists, preferably, of a stip of stiff material—such, for instance, as stiff leather—which is suitably attached to and arranged longitudinally of the chain 29, but possesses, however, sufficient flexibility to enable it to curve circumferentially of the chain-engaging sprocket-wheels 26 and 28 during the actuation of the said chain or conveyer.

It will be observed that the strand *w* is located far enough from the dough-delivering end of the table *a* to accommodate the passage of the piece of dough fed by the conveyer of the said table past the strand *w* in the direction of the said end of the said table before the said piece of dough is overturned onto the table *a*. The strand *w* is fine enough to avoid interference with the passage thereover of the dough, and the strand is flexible and does not in anywise mutilate or injure the dough; but the strand, being a piece of wire, is flexible and round in cross-section, and the said strand simply operates as a loosener to positively loosen the dough relative to the conveyer of the table A before the apron bearing the said dough is overturned onto the table *a*. The employment of a fine strand extending transversely of and arranged in contact with a movable dough-feeding surface is of no inconsiderable importance, and I would have it understood that my invention covers, broadly, the combination, with a movable surface upon which dough is rolled, of a fine strand arranged to loosen the dough relative to the said surface by the interposition of the strand between the said surface and the dough.

What I claim is—

1. In combination, a dough-rolling table; means for loosening dough rolled upon the said table relative to the table; another table arranged to receive the loosened dough, and means whereby the loosened dough is turned over and onto the last-mentioned table.

2. In combination, a table comprising a movable dough-feeding conveyer, and means for rolling and thereby elongating a piece of dough upon the said table, of mechanical means for loosening the elongated piece of dough relative to the said table, another table arranged to receive the loosened elongated piece of dough, and means whereby the loosened piece of dough is turned over and onto the last-mentioned table.

3. In combination, a dough-feeding conveyer; means for rolling a piece of dough upon and longitudinally of the said conveyer; another conveyer arranged in suitable proximity to the first-mentioned conveyer; means for loosening dough relative to the first-mentioned conveyer and arranged between the aforesaid dough-rolling means and the second-mentioned conveyer; means for rolling dough upon the second-mentioned conveyer, and means for effecting the delivery of dough rolled upon and loosened relative to the first-mentioned conveyer onto the second-mentioned conveyer.

4. In combination, a table comprising a dough-feeding conveyer and means for rolling a piece of dough upon and longitudinally of the said conveyer; means for loosening the elongated piece of dough relative to the conveyer; another table arranged in suitable proximity and at an angle to the first-mentioned table and comprising a dough-feeding conveyer and means for rolling the dough upon and longitudinally of the last-mentioned conveyer, and means for effecting the delivery, to and crosswise of the last-mentioned conveyer, of the piece of dough elongated upon and loosened relative to the conveyer of the first-mentioned table.

5. In combination, a table comprising a dough-feeding conveyer and means for rolling a chunk or piece of dough upon and elongating it longitudinally of the said conveyer; means for loosening the elongated piece of dough relative to the said conveyer; another dough-feeding conveyer arranged in suitable proximity to the first-mentioned conveyer and means for rolling the dough upon and longitudinally of the last-mentioned conveyer, and means for effecting not only the delivery, to and crosswise of the last-mentioned conveyer of the piece of dough elongated and loosened relative to the first-mentioned conveyer, but also turning the dough over during the said delivery.

6. In combination, a dough-feeding conveyer having dough-receiving aprons suitably spaced longitudinally of the conveyer; means for rolling a piece of dough placed upon an apron; and means for loosening the rolled piece of dough relative to the dough-bearing apron.

7. In combination, a dough-rolling table comprising a dough-feeding conveyer having dough-receiving aprons arranged at suitable intervals longitudinally of the outer side of the said conveyer; means for rolling a piece of dough placed upon an apron into an oblong shape longitudinally of the conveyer; means for again rolling the dough upon the said apron and thereby further elongating the piece of dough longitudinally of the conveyer, and means for loosening the finally-elongated piece of dough relative to the dough-bearing apron.

8. In combination, a dough-rolling table comprising a dough-feeding conveyer having dough-receiving aprons arranged at suitable intervals longitudinally of the outer side of the said conveyer; means for rolling a piece of dough placed upon an apron into an oblong shape longitudinally of the conveyer, and a strand for loosening the rolled dough relative to the dough-bearing apron.

9. In combination, a dough-rolling table; an endless dough-feeding conveyer arranged to deliver dough to the said table and provided with dough-receiving aprons arranged at suitable intervals longitudinally of the conveyer, which aprons are attached only at the forward end and capable of swinging, during the actuation of the conveyer in the required direction, upwardly toward and over the aforesaid table so as to deliver the dough thereon onto the said table; dough-rolling means arranged to operate upon a piece of dough placed upon an apron a suitable distance from the aforesaid table and thereby give the said piece of dough an oblong shape; other dough-rolling means arranged nearer the said table in position to operate upon the partially-elongated piece of dough and further elongate the said piece, and means for loosening the dough relative to the dough-bearing apron between the last-mentioned dough-rolling means and the said table.

10. In combination, a dough-rolling table, an endless dough-feeding conveyer arranged to deliver dough to the said table and provided with dough-receiving aprons arranged at suitable intervals longitudinally of the conveyer, which aprons are attached only at the forward end and capable of swinging, during the actuation of the conveyer in the required direction, upwardly toward and over the aforesaid table so as to deliver the dough thereon onto the said table; dough-rolling means arranged to operate upon a piece of dough placed upon an apron a suitable distance from the aforesaid table and thereby give the said piece of dough an oblong shape; and a fine strand for loosening the dough relative to the dough-bearing apron between the dough-rolling means and the aforesaid table.

11. The combination, with a dough-rolling table, and a conveyer arranged to feed dough to the said table and provided with dough-receiving aprons arranged at suitable intervals longitudinally of the conveyer, which aprons are attached only at the forward end and capable of swinging, during the actuation of the conveyer in the required direction, upwardly toward and over the aforesaid table so as to deliver the dough thereon onto the said table, and dough-rolling means arranged to operate upon a piece of dough placed upon an apron a suitable distance from the aforesaid table and thereby give the said piece of dough an oblong shape, of a strand for loosening the dough relative to the dough-bearing apron between the dough-rolling means and the said table, which strand is arranged to be rendered operative and bear upon the dough-laden apron in advance of the dough upon the apron and remain operative until after the passage of dough over the strand, and means whereby the strand is rendered inoperative and held in an inoperative position until the next succeeding apron has begun to pass in under the strand.

12. The combination, with a dough-rolling table, and a conveyer arranged to feed dough to the said table and provided with dough-receiving aprons arranged at suitable intervals longitudinally of the conveyer, which aprons are attached only at the forward end and capable of swinging, during the actuation of the conveyer in the required direction, upwardly toward and over the aforesaid table so as to deliver the dough thereon onto the said table, and dough-rolling means arranged to operate upon a piece of dough placed upon an apron a suitable distance from the aforesaid table and thereby give the said piece of dough an oblong shape, of a strand for loosening the dough relative to the dough-bearing apron between the dough-rolling means and the said table, which strand is arranged over and transversely of the path of the said apron; means whereby the said strand is caused to bear upon the dough-laden apron in advance of the dough upon the apron and remain operative until after the passage of the dough over the strand, and means whereby the strand is rendered inoperative and held in an inoperative position until the next succeeding apron has begun to pass in under the strand.

13. The combination, with a dough-rolling table, and a conveyer arranged to feed dough to the said table and provided with dough-receiving aprons arranged at suitable intervals longitudinally of the conveyer, which aprons are attached only at the forward end and capable of swinging, during the actuation of the conveyer in the required direction, upwardly toward and over the aforesaid table so as to deliver the dough thereon onto the said table, and dough-rolling means arranged to operate upon a piece of dough placed upon an apron a suitable distance from the aforesaid table and thereby give the said piece of dough an oblong shape, of a strand for loosening the dough relative to the dough-bearing apron between the dough-rolling means and the said table, which strand is arranged to be rendered operative and closely engage the dough-laden apron in advance of the dough upon the apron and remain operative until after the passage of the dough over the said strand; means for bearing upwardly upon the under side of the dough-bearing apron during the passage of the dough over the strand, and means whereby the strand is rendered inoperative and held in an inoperative position until the next succeeding apron has begun to pass in under the strand.

14. The combination, with a dough-feeding conveyer having dough-carrying aprons arranged at suitable intervals longitudinally of the conveyer, which aprons are attached only at the forward end, and dough-rolling means arranged to operate upon a piece of dough placed upon an apron a suitable distance from the place of delivery of dough from the conveyer and thereby to give the said piece of dough an oblong shape; of a shaft capable of oscillation and arranged a suitable distance above and transversely of the conveyer and provided with two arms projecting downwardly and in the direction of the aforesaid place of delivery from opposite end portions respectively of the shaft; a strand extending between and attached to the free ends of the said arms and arranged to rest, in its lower and operative position, upon a dough-laden apron passing in under it; means arranged to afford bearing to and lift the said apron during the passage of the apron in under the strand, and means whereby the aforesaid arms are swung in the direction required to elevate the strand above the dough upon the apron when the said dough has passed over the strand and held in their upwardly-swung position until the next succeeding apron has begun to pass in under the strand.

15. The combination, with a dough-feeding conveyer having dough-carrying aprons arranged at suitable intervals longitudinally of the conveyer, which aprons are attached only at the forward end, and dough-rolling means arranged to operate upon a piece of dough placed upon an apron a suitable distance from the place of delivery of dough from the conveyer and thereby give the said piece of dough an oblong shape; of a shaft capable of oscillation and arranged a suitable distance above and transversely of the conveyer and provided with two arms projecting downwardly and in the direction of the aforesaid place of delivery from opposite end portions respectively of the shaft; a strand extending between and attached to the free ends of the said arms and arranged to rest, in its lower and operative position, upon a dough-laden apron passing in under it; a roller arranged to afford bearing to and lift the said apron during the passage of the apron in under the strand, and means whereby the aforesaid arms are swung in the direction required to elevate the strand above the dough upon the apron when the said dough has passed over the strand and held in their upwardly-swung position until the next succeeding apron has begun to pass in under the strand.

16. The combination, with a dough-feeding conveyer having dough-carrying aprons arranged at suitable intervals longitudinally of the conveyer, which aprons are attached only at the forward end, and dough-rolling means arranged to operate upon a piece of dough placed upon an apron a suitable distance from the place of delivery of dough from the conveyer and thereby give the said piece of dough an oblong shape; of a strand arranged over and transversely of the path of a dough-laden apron and in position to rest, in its lower and operative position, upon the said apron; a roller arranged to afford bearing to and lift the said apron during the passage of the apron in under the strand, and means whereby the strand is lifted above the dough upon the apron when the said dough has passed over the strand and held elevated until the next succeeding apron has begun to pass in under the strand.

17. The combination, with a dough-feeding conveyer having dough-carrying aprons arranged at suitable intervals longitudinally of the conveyer, which aprons are attached only at the forward end, and dough-rolling means arranged to operate upon a piece of dough placed upon an apron a suitable distance from the place of delivery of dough from the conveyer and thereby give the said piece of dough an oblong shape; of a strand arranged over and transversely of the path of a dough-laden apron and in position to rest, in its lower and operative position, upon the said apron; means acting to hold the strand down upon the said apron, and means whereby the strand is lifted above the dough upon the apron when the said dough has passed over the strand and held elevated until the next succeeding apron has begun to pass in under the strand.

18. In combination, a dough-rolling table; two diametrically-corresponding sprocket-wheels L arranged in line axially and in the same plane horizontally adjacent the said table; endless chains operatively engaging the said sprocket-wheels and instrumental in forming an endless conveyer and provided, at the outer side of the conveyer, with dough-receiving aprons arranged at suitable intervals longitudinally of the conveyer, which aprons are attached to the chains at their forward ends; a pair of dough-rolling rolls arranged at and transversely of the upper side and lower side respectively of the upper and dough-feeding portion of the said conveyer a suitable distance from the aforesaid table, and means for loosening the dough relative to the dough-bearing aprons between the rolls and the table, and the arrangement of the parts being such that the aprons are capable of swinging from over the aforesaid sprocket-wheels, during the actuation of the conveyer in the required direction, upwardly toward and over the said table.

19. In combination, a dough-rolling table; two diametrically-corresponding sprocket-wheels L arranged in line axially and in the same plane horizontally adjacent the said table; and endless chains operatively engaging the said sprocket-wheels and instrumental in forming an endless conveyer and provided, at the outer side of the conveyer, with dough-receiving aprons arranged at suitable intervals longitudinally of the conveyer, which aprons are attached to the chains at their forward ends, and a pair of dough-rolling rolls arranged at and transversely of the upper side and lower side respectively of the upper and dough-feeding portion of the said conveyer a suitable distance from the aforesaid table, and the arrangement of the parts being such that the aforesaid aprons are capable of swinging from over the aforesaid sprocket-wheels, during the actuation of the conveyer in the required direction, upwardly toward and over the said table, and the lower roll of the aforesaid pair of rolls being annularly grooved in their periphery to accommodate the location of the aforesaid chains.

20. In combination, a dough-feeding conveyer having aprons arranged at suitable intervals longitudinally of the conveyer and attached to the conveyer at their forward end; a strand arranged over and transversely of the path of a dough-laden apron and in position to rest, in its lower and operative position, upon the said apron; a roller arranged to afford bearing and lift the said apron during the passage of the apron in under the strand, which roll has a convex peripheral surface; means whereby the strand is lifted above the dough upon the apron when the said dough has passed over the strand and held elevated until the next succeeding apron has begun to pass in under the strand, and dough-rolling means arranged to operate upon the said dough preparatory to the passage of the loosening of the said dough relative to the dough-laden apron by the strand.

21. In combination, means for rolling a chunk or piece of dough into an oblong shape; means for rolling the oblong piece of partially-rolled dough widthwise of the said piece; means for conveying the dough to the last-mentioned dough-rolling means from the first-mentioned dough-rolling means, and means for loosening the dough relative to the dough-conveying means during the travel of the dough from the first-mentioned dough-rolling means.

22. In combination, means for rolling a chunk or piece of dough into an oblong shape; means for rolling the oblong piece of partially-rolled dough widthwise of the said piece; means for conveying the dough to the last-mentioned dough-rolling means from the first-mentioned dough-rolling means; means for loosening the dough relative to the dough-conveying means during the travel of the dough from the first-mentioned dough-rolling means, and means for turning the loosened dough over preparatory to the operation upon it by the second-mentioned dough-rolling means.

23. In combination, a dough-feeding conveyer having dough-receiving aprons arranged at suitable intervals longitudinally of the conveyer; means for rolling a piece of dough placed upon an apron longitudinally of the conveyer, and a strand for loosening the rolled dough relative to the dough-bearing apron and arranged to be interposed between the said apron and the dough carried by the apron.

24. In combination, a dough-feeding conveyer having dough-receiving aprons arranged at suitable intervals longitudinally of the conveyer; means for spreading dough placed upon an apron, and a fine strand for loosening the spread dough relative to the dough-bearing apron.

25. A dough-rolling table provided with a fine strand extending transversely of the said table and arranged for interposition between the table and dough rolled or spread upon the table.

26. A dough-rolling table provided with a strand extending transversely of the said table and arranged for interposition between the table and the dough rolled or spread upon the table, which strand is fine enough to accommodate the passage of the dough over the strand while the dough rests upon the table.

27. The combination, with a dough-rolling table comprising an endless dough-feeding conveyer, and rolls arranged to roll or spread dough fed by the said conveyer and located a suitable distance from the dough-delivering end of the said table, and means for actuating the said conveyer, of a fine strand arranged above and transversely of the conveyer between the rolls and the dough-delivering end of the table and far enough from the said end of the table to accommodate the passage of dough operated upon by the rolls past the strand during the passage of the dough toward the aforesaid end of the table, the said strand being arranged to be interposed between the conveyer and the dough fed by the conveyer with contact between the strand and the conveyer.

28. The combination, with a dough-rolling table comprising an endless dough-feeding conveyer, and rolls arranged to roll or spread dough fed by the said conveyer and located a suitable distance from the dough-delivering end of the said table, and means for actuating the said conveyer, of a fine strand arranged above and transversely of and movable from and toward the said conveyer between the rolls and the dough-delivering end of the table and far enough from the said end of the table to accommodate the passage of dough operated upon by the rolls past the strand during the passage of the dough toward the aforesaid end of the table, the said strand being arranged to be interposed between the conveyer and the dough fed by the conveyer with contact between the strand and the conveyer, and means for actuating the said strand relative to the conveyer.

29. The combination, with a dough-feeding conveyer and dough-rolling means arranged to operate upon a piece of dough fed by the said conveyer of a movable strand for loosening the rolled dough relative to the conveyer, which strand in its operative position is arranged to loosen the dough relative to the conveyer and rendered operative in advance of the dough carried by the conveyer and remains operative until after the passage of the dough over the strand, and means whereby the strand is rendered inoperative and held in an inoperative position until the next succeeding piece of dough to be loosened has approached within suitable proximity of the strand.

30. The combination, with a dough-feeding conveyer provided with dough-receiving aprons suitably spaced longitudinally of the conveyer and dough-rolling means arranged to operate upon a piece of dough placed upon an apron, of a strand for loosening the dough relative to the dough-bearing apron and arranged to be rendered operative and bearing upon the dough-laden apron in advance of the dough upon the apron and remaining operative until after the passage of the dough over the strand, and means whereby the strand is rendered inoperative and held in an inoperative position until the next succeeding apron has begun to pass in under the strand.

31. In combination, two diametrically-corresponding sprocket-wheels arranged in line axially and in the same plane horizontally, endless chains operatively engaging the sprocket-wheels and instrumental in forming an endless conveyer and provided with dough-receiving aprons suitably spaced longitudinally of the conveyer and overlapping the upper sides of both chains, which aprons are attached to the chains only at their forward ends, and means for operating upon dough carried by the aprons during the actuation of the aprons.

32. In combination, two diametrically-corresponding sprocket-wheels arranged in line axially and in the same plane horizontally, endless chains operatively engaging the sprocket-wheels and instrumental in forming an endless conveyer and provided with dough-receiving aprons suitably spaced longitudinally of the conveyer, which aprons are attached to the chains only at their forward ends; means for rolling dough carried by the aprons during the actuation of the aprons; means for loosening the rolled dough relative to the dough-bearing aprons, and the arrangement of the parts being such that the aprons are capable of swinging from over the aforesaid sprocket-wheels during the actuation of the conveyer in the required direction and thereby deliver the loosened dough from the aprons.

33. In combination, a dough-feeding conveyer comprising a pair of suitably-actuated endless chains, and a pair of dough-rolling rolls arranged at and transversely of the upper side and lower side respectively of the upper and dough-feeding portion of the conveyer, with the said chains extending through the lower roll at the periphery of the said roll, which roll is peripherally grooved circumferentially to accommodate the location of the aforesaid chains.

34. In combination, an endless dough-feeding conveyer having aprons suitably spaced longitudinally of the conveyer and attached to the conveyer at their forward ends; a movable strand extending over and transversely of and movable toward and from the upper and dough-feeding portion of the conveyer, and arranged to rest in its lower and operative position upon an apron of the conveyer; a roller arranged to afford bearing to and lift the said apron during the passage of the apron in under the strand, and means whereby the strand is elevated above the travel of the dough when the said dough has passed over the strand and held elevated until the next succeeding apron has begun to pass in under the strand.

35. In combination, an endless dough-feeding conveyer; a dough-loosening strand extending over and transversely of and movable toward and from the upper and dough-feeding portion of the conveyer and arranged in contact with the conveyer during its operation, and a roller arranged to afford bearing to and lift the dough-carrying portion of the conveyer during the passage of the said portion under the strand.

36. In combination, a dough-feeding conveyer; a flexible dough-loosening strand extending transversely of the conveyer, and means for maintaining contact between the strand and the conveyer during the operation of the strand.

37. In combination, a dough-loosening flexible strand, a dough-feeding conveyer extending in under the strand and arranged to feed dough over the strand; means for causing the conveyer to bear upwardly against the strand, and means for rolling the dough upon the conveyer preparatory to the passage of the dough over the strand.

38. The combination, with a movable dough-feeding surface, of a strand extending transversely of the travel of the said surface and arranged for interposition between the said surface and dough rolled or spread upon the said surface, which strand is fine enough to accommodate the passage of the dough over the strand while the dough rests upon the dough-feeding surface.

39. In a dough-rolling apparatus, a table comprising an endless dough-feeding conveyer consisting of two parallel endless chains arranged side by side and a suitable distance apart laterally, with each chain provided with laterally-projecting members spaced longitudinally of the conveyer and arranged in line endwise with the different projecting members respectively of the other chain; dough-receiving aprons which are wide enough to render them capable of resting upon both chains and respectively provided at their forward end with two ears or members arranged a suitable distance apart laterally and in line endwise and journaled upon one of the aforesaid projecting members of the different chains respectively, and the chains having enough slack to accommodate the detachment of an apron from the engaging members of the chains; means for rolling dough carried by said aprons, and a bed arranged below and in position to limit the sagging of the upper and dough-feeding portion of the conveyer between the dough-rolling means and the dough-receiving end of the table.

40. In combination, two diametrically-corresponding sprocket-wheels arranged in line axially and in the same plane horizontally; endless chains operatively engaging the sprocket-wheels and instrumental in forming an endless conveyer and provided each with laterally-projecting members spaced longitudinally of the conveyer, with the projecting members of each chain arranged in line endwise and projecting away from the different corresponding projecting members respectively of the other chain; dough-receiving aprons arranged at suitable intervals longitudinally of the conveyer and provided at their forward ends with two ears or members journaled upon one of the aforesaid projecting members of the different chains respectively; a pair of dough-rolling rolls arranged at and transversely of the upper side and lower side respectively of the upper and dough-feeding portion of the conveyer; and the lower roll of said pair of rolls being provided externally with annular circumferentially-extending recesses arranged to accommodate the location of the chains and wide enough to accommodate the pressing of the chains toward each other to detach any apron from the engaging members of the chains.

41. In combination, two diametrically-corresponding sprocket-wheels arranged in line axially and in the same plane horizontally; endless chains operatively engaging the said sprocket-wheels and instrumental in forming an endless conveyer; dough-receiving aprons arranged at suitable intervals longitudinally of and attached at their forward ends to the chains and wide enough to rest upon both chains; a pair of intergeared dough-rolling rolls arranged at and transversely of the upper side and lower side respectively of the upper and dough-feeding portion of the conveyer, means for transmitting power to one of the aforesaid rolls, and an operative connection between the lower roll and the aforesaid sprocket-wheels, which operative connection is arranged between the upper and lower portions of the conveyer.

42. In combination, a dough-feeding conveyer provided with dough-carrying aprons spaced longitudinally of the conveyer; dough-rolling means arranged to operate upon a piece of dough placed upon an apron of the upper and dough-feeding portion of the conveyer; a shiftable strand arranged above and transversely of the travel of the aprons and in position to loosen the dough relatively to a dough-bearing apron in the lower position of the strand; a shaft capable of oscillation and arranged a suitable distance from and transversely of the conveyer, which shaft is provided with arms bearing the strand; a revoluble member; means for actuating the revoluble member and an arm rigid with the shaft and extending into the path of the said revoluble member, and the parts being so arranged and timed that normally the strand is arranged to bear upon a dough-laden apron moving in under the strand in advance of the dough upon the apron and remains operative until after the passage of the dough over the strand whereupon the aforesaid revoluble member comes into engagement with the last-mentioned shaft-arm and oscillates the shaft in the direction and to the extent required to elevate the strand and thereby render the strand inoperative until the next succeeding apron has begun to pass in under the strand.

43. In combination, a dough-feeding conveyer; dough-rolling means arranged to operate upon a piece of dough placed upon the conveyer; a shiftable strand arranged above and transversely of the conveyer, and in position to loosen the dough relative to the conveyer, a shaft capable of oscillation and arranged a suitable distance above and transversely of the conveyer between the strand and the dough-rolling means, which shaft is provided with depending arms bearing the strand, a revoluble member arranged a suitable distance below the shaft; means for actuating the revoluble member, and an arm rigid with the shaft and depending into the path of the said revoluble member, and the parts being so arranged and timed that the strand bears upon the conveyer in advance of the piece of dough to be loosened and remains operative until after the passage of the said piece of dough over the strand whereupon the aforesaid revoluble member comes into engagement with the last-mentioned shaft-arm and oscillates the shaft in the direction and to the extent required to elevate the strand.

44. In combination, a dough-feeding conveyer; dough-rolling rolls adapted to operate upon a piece of dough placed upon an apron of the conveyer; means for operating the rolls; a shiftable strand arranged above and transversely of the conveyer and in position to loosen the dough relative to the conveyer; a shaft capable of oscillation and arranged a suitable distance from and transversely of the conveyer, which shaft is provided with arms bearing the strand; a revoluble member intergeared with one of the aforesaid rolls, and an arm rigid with the shaft and extending into the path of the said revoluble member, and the parts being so arranged and timed that the strand bears upon the conveyer in advance of the dough to be loosened and remains operative until after the passage of the dough over the strand whereupon the aforesaid revoluble member comes into engagement with the last-mentioned shaft-arm and oscillates the shaft in the direction and to the extent required to elevate the strand and thereby render the strand inoperative.

45. In combination, with a dough-rolling table comprising a dough-feeding conveyer and a dough-rolling means arranged to operate upon dough carried by the conveyer, of a bottom bearing for the upper and dough-feeding portion of the conveyer between the dough-rolling means and the dough-delivering end of the table; a shiftable strand arranged above and transversely of the travel of the dough rolled upon the conveyer, and substantially in the same plane vertically with the aforesaid bearing and in position to loosen the dough relatively to the conveyer in the lower position of the strand, and means for elevating and thereby rendering the strand inoperative.

46. The combination, with a dough-rolling table comprising a dough-feeding conveyer which consists of two parallel endless chains arranged side by side and a suitable distance apart laterally and aprons attached at their forward ends only to the said chains and wide enough to rest upon the chains, which aprons are spaced longitudinally of the conveyer, a dough-rolling means arranged to operate upon dough placed upon the aprons, of a bottom bearing for the aprons between the dough-rolling means and the dough-delivering end of the table, which bearing is approximately as wide as the space between the aforesaid chains; a shiftable strand arranged above and transversely of the travel of the aprons and vertically over the aforesaid bearing and in position to loosen the dough relative to the aprons in the lower positions of the strand, and means for elevating and thereby rendering the strand inoperative.

47. The combination, with a dough-rolling table comprising a dough-feeding conveyer which consists of two parallel endless chains arranged side by side and a suitable distance apart laterally and aprons attached to their forward ends only to the said chains, and wide enough to rest upon the chains, which aprons are spaced longitudinally of the conveyer, and dough-rolling means arranged to operate upon dough placed upon the aprons, of a roller between the dough-rolling means and the dough-delivering end of a table and arranged within and transversely of the space between the aforesaid chains and in position to form a bottom bearing for the aprons, which roller extends approximately the full width of the said space and has a diameter increasing from both ends toward the central portion of the roller; a shiftable strand arranged above and transversely of the travel of the aprons and in the same or approximately the same plane vertically with the axis of the aforesaid roller and in position to loosen the dough relative to the aprons in the lower position of the strand, and means for elevating and thereby rendering the strand inoperative.

In testimony whereof I sign the foregoing specification in the presence of two witnesses.

JOSEPH H. BURNS.

Witnesses:
C. H. DORER,
G. M. HAYES.